United States Patent [19]

Kaller et al.

[11] Patent Number: 4,731,151
[45] Date of Patent: Mar. 15, 1988

[54] APPARATUS FOR MOUNTING READY-MADE HEADLINERS INTO AUTOMOTIVE BODIES

[75] Inventors: Adolf Kaller, Baar; Wilfried Michel, Stammham; Josef Motzet, Ingolstadt, all of Fed. Rep. of Germany

[73] Assignee: Audi AG., Ingolstadt, Fed. Rep. of Germany

[21] Appl. No.: 40,135

[22] Filed: Apr. 20, 1987

Related U.S. Application Data

[63] Continuation-in-part of Ser. No. 760,155, Jul. 29, 1985, abandoned, which is a continuation of Ser. No. 550,597, Nov. 8, 1983, abandoned.

[51] Int. Cl.$^4$ .................. B32B 31/04; B32B 31/20; B32B 31/26
[52] U.S. Cl. ................... 156/556; 100/211; 156/360; 156/362; 156/363; 156/379.8; 156/382; 156/580; 254/2 C; 254/93 HP; 269/22; 269/48.1; 269/50; 296/21 Y
[58] Field of Search ............ 29/526 R, 430, 431; 156/351–352, 358, 362, 363, 285, 382, 379.6, 379.8, 423, 380.9, 553–554, 556, 566, 580–581, 156, 228, 273.7, 287, 293, 297, 299, 303.1, 306.3, 312, 538; 254/93 HP, 2 R, 2 C; 100/211; 296/21 Y; 269/22, 47, 48.1, 50

[56] References Cited

U.S. PATENT DOCUMENTS

| | | | |
|---|---|---|---|
| 3,512,754 | 5/1970 | Cleland | 269/22 |
| 3,657,044 | 4/1972 | Singer | 156/475 |
| 3,799,504 | 3/1974 | Vaughen | 254/93 HP |
| 3,964,958 | 6/1976 | Johnston | 100/211 |
| 4,030,961 | 6/1977 | Straeten | 156/580 |
| 4,453,303 | 6/1984 | Leddet | 29/701 |

FOREIGN PATENT DOCUMENTS 0072277  2/1983  European Pat. Off. .
1755604  5/1968  Fed. Rep. of Germany .

Primary Examiner—Donald E. Czaja
Assistant Examiner—Merrell C. Cashion, Jr.
Attorney, Agent, or Firm—Karl Hormann

[57] ABSTRACT

An apparatus for automatically mounting ready-made headliners into automotive bodies, comprising a jig selectively connectible to an assembly line conveyor to move synchronously therewith while performing the headliner mounting operation by moving a platform with a preferably adhesive coated headliner placed thereon through a window cut-out of a body, elevating the headliner into contact with the ceiling of the body while simultaneously moving a counter-pressure fixture against the roof of the body, and thereafter disconnecting from the conveyor to move in a direction opposite the movement of the conveyor, into a position for loading another headliner and reconnecting to the conveyor for another mounting cycle.

19 Claims, 4 Drawing Figures

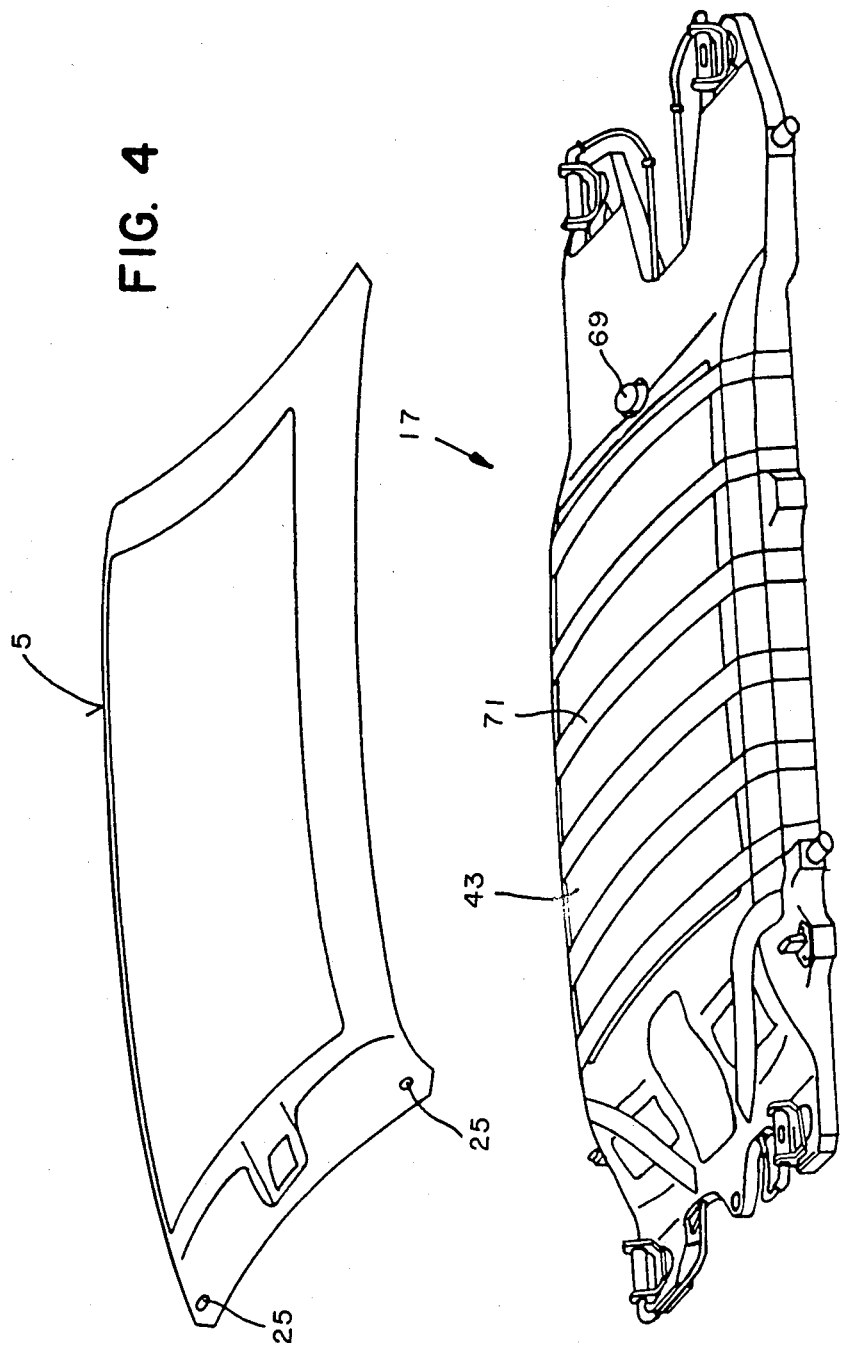

APPARATUS FOR MOUNTING READY-MADE HEADLINERS INTO AUTOMOTIVE BODIES

REFERENCE TO RELATED APPLICATIONS

This is a Continuation-in-part application of application Ser. No. 760,155 filed July 29, 1985, now abandoned, which is a continuation application of application Ser. No. 550,597 filed Nov. 8, 1983, now abandoned.

BACKGROUND OF THE INVENTION

1. Field of the Invention

The present invention relates generally to an apparatus for mounting ready-made headliners into automotive vehicles and, more particularly, to an apparatus integrated into an assembly line for mounting ready-made headliners into automotive vehicle bodies substantially automatically and in synchronism with other operations performed on the assembly line.

2. Description of the Prior Art

Formerly, headliners have been mounted into cabins of passenger vehicles by fabrics being sewn, tacked, or stapled by relatively tedious methods to staves affixed to the roof of such cabins. Such methods, because they are labor intensive, are expensive. Since the labor is performed manually the results are not always uniform and satisfactory. Moreover, such methods have defied integration into automatic assembly line production cycles since as a rule they require assembly intervals which are often irregular or exceed the time slot allotted for this assembly operation and thus interfere with the intervals of other operations performed on the assembly line. Therefore, the mounting of headliners was usually performed in operations remote from assembly lines.

In accordance with more recent assembly methods ready-made or composite headliners have been mounted into vehicles by what may be termed a semi-automatic process. To practice this method, a workman would utilize a manually operated and controlled jig upon which he would place a headliner and then move it into the interior of an automotive body through a window cut-out thereof.

The jig is provided with handles of sufficient length to permit movement of the headliner into the interior of the body such that its forward margin becomes generally aligned with a predetermined portion of the body, for instance a transom adjacent the windshield cut-out. When the headliner has thus been moved into the interior of the body or compartment the workman, by skillfully manipulating the handles, aligns a clip provided on the headliner with a recess in the transom. The clip is then placed into the recess for properly aligning the headliner relative to the ceiling of the compartment. The headliner, on its surface facing the ceiling, is coated with an adhesive layer, and by pressing it against the ceiling is bonded therewith. The pressure required for the adhesive bonding is generated by feet connected to the jig and movable relative thereto by appropriate motion means for engaging the floor of the compartment. Once a firm bond has been established between the ceiling of the compartment and the headliner, the feet of the jig are retracted and the jig is withdrawn from the compartment.

This method of mounting a headliner suffers from the fact that it requires a great deal of manual skill and dexterity on the part of the workman and from the fact that it is not readily adaptable for integration into an assembly line operation. As will be appreciated by persons skilled in the art the apparatus or jig employed for the mounting of the headliner is disadvantageous in that it requires the workman to move in and out between consecutively moving automotive bodies. There would have to be sufficient space between the bodies to accommodate the workman and the jig with its handles, and the headliner.

Aside from possibly subjecting the workman to safety hazards, the apparatus further suffers from the fact that it depends upon the vertical radial strength of the automotive body for the exertion of pressure adequate to bring about the bonding of the headliner to the ceiling. This may make necessary certain otherwise unnecessary reinforcements on the bodies, particularly in the case of unitized bodies, to avoid ruptures or broken spot welds. The apparatus is at any rate difficult to operate, not least owing to its substantial size.

Specifically, such a jig requires considerable space in the longitudinal dimension of a vehicle body. That is to say, that part of the jig which supports the headliner must correspond in length more or less to the length of the headliner or the ceiling of the vehicle body, and, to allow the workman to manipulate the operating handles properly and accurately, they have to be about as long as the hood or the trunk of the vehicle, depending upon whether the headliner is inserted through the windshield cut-out or the rear window cut-out. Given these dimensional requirements, the space required for the withdrawal of the jig subsequent to the mounting of a headliner has to be at least equal to the length of the headliner. However, in a modern assembly line operation automobile bodies are for economic reasons spaced at intervals closer than that. Thus the method described is practiced either on a branch assembly line or in an auxiliary work station. The difficulties involved in the synchronization of the movement of vehicle bodies out of and into an assembly line to accommodate the headliner mounting operation are, of course, numerous and may contribute to disruptions in the overall manufacturing process. In any event they mitigate against incorporation into an automatic assembly process. Also, they adversely affect manufacturing costs.

Another problem inherent in this prior art mounting jig is that the feet required for supporting the jig on the floor of the body for pressing the headliner against the ceiling have to be supported by the floor of the body. As alluded to above, this may result in broken spot welds or deformations of the floor, or both. In turn, such deformations may lead to deviations in tolerances which, in turn, may result in misaligned headliners, particularly where the recess in the roof transom serves as the sole point of reference for aligning or orienting the headliner. Guide rollers moving along the upright roof supports of the body during the raising of the headliner may somewhat improve the alignment operation but, in fact, they serve only to move the clip on the headliner into the recess in the transom. Since the operation of feeding and aligning the headliners is essentially a manually executed one, much time is needed for the successful execution of each mounting cycle. The problems are compounded where headliners of differing shapes are to be mounted into bodies of differing styles, for the headliner supports of the jig would have to be changed to accommodate the various headliners.

It is therefore an object of the invention to provide an apparatus for mounting headliners in a substantially fully automated manner.

A more particular object of the invention is to provide an apparatus for mounting headliners into vehicular bodies in an operation integrated into an assembly line.

Furthermore, it is an object of the invention to provide an apparatus which operates in synchronism with an assembly line.

Another object of the invention is to provide a headliner mounting apparatus which may be selectively connected to and disconnected from an assembly line.

Yet another object of the invention is the provision of a headliner mounting apparatus which is capable of operating within the rather restricted space available between consecutively placed vehicular bodies in a modern assembly line.

An important object of the invention is to provide an apparatus for automatically mounting headliners of differing shapes into commensurately differently shaped vehicular bodies.

Other objects of the invention will in part be obvious and will in part appear hereinafter. The invention accordingly comprises the method and apparatus possessing the elements and combinations thereof, construction and arrangements of parts which are exemplified in the following detailed disclosure.

SUMMARY OF THE INVENTION

In accordance with a preferred embodiment of the invention a novel apparatus for automatically mounting headliners into vehicular bodies is provided which in order to prevent any relative movement between an automotive body and the headliner to be mounted thereinto may be selectively connected to the conveyor system of an assembly line at a first position for synchronous movement therewith during an interval of a length sufficient to mount a headliner and which may thereafter be disconnected from the conveyor at a second position and returned to the first position to commence another headliner mounting cycle. Means mounted on said apparatus for carrying a headliner and movable parallel to and vertically of the movement of the conveyor may be provided for inserting a headliner into the interior of a vehicular body and for moving it into engagement with the ceiling thereof. Also, means may be provided for simultaneously exerting controlled counterpressure against the roof of the body for the support and protection thereof against deformations.

The means for moving the headliner and for supporting the roof may be integral with each other and may be provided with means for moving them simultaneously in directions substantially parallel to the motion of the conveyor system as well as in directions vertically thereof. The vertical movement of the headliner carrying means and of the roof support preferably takes place in opposite directions.

In a preferred embodiment of the invention, the moving and supporting means may comprise a substantially C-shaped clamping member the arms of which may be provided with means for moving them towards and away from each other.

In a further advantageous embodiment, the arms of the moving and supporting means, on their surfaces may be provided with inflatable means. Preferably, the inflatable means may be connected to a common source of pressure.

The carrying means is preferably provided with appropriate sensing means for correctly positioning the headliner relative to the ceiling of a vehicular body. Further sensors may be provided for controlling the movement of the apparatus between its first and second positions.

In an advantageous embodiment of the invention means may be provided near one of the first and second positions of the apparatus for loading a headliner onto the carrying means. Preferably, the headliner is first placed onto a pallet member for positioning therewith onto the carrying means by movement in a direction substantially transverse of the direction of movement of the conveyor system. Advantageously, the insertion of the headliner onto the carrying means is accompanied by the removal or ejection of an empty pallet from the carrying means. The pallet means may preferably be provided with inflatable means and may be substituted for the inflatable means of the moving means. In a preferred embodiment of the invention the inflatable means may be provided with releasable belt means to provide for a pattern of radially spreading engagement between the headliner and the ceiling of the vehicular body.

Preferably, elevator means are provided on at least one side of the conveyor system at one of the first and second positions for supplying headliners and for receiving empty pallets.

BRIEF DESCRIPTION OF THE DRAWINGS

The novel features which are considered characteristic of the invention are set forth with particularly in the appended claims. The invention itself, however, both in its organization and method of operation, together with other objects and advantages thereof, will be best understood from the following description of the illustrative embodiments when read in connection with the accompanying drawings, in which:

FIG. 4 is an exploded view of a headliner and pallet means in accordance with the invention.

Figure 1:
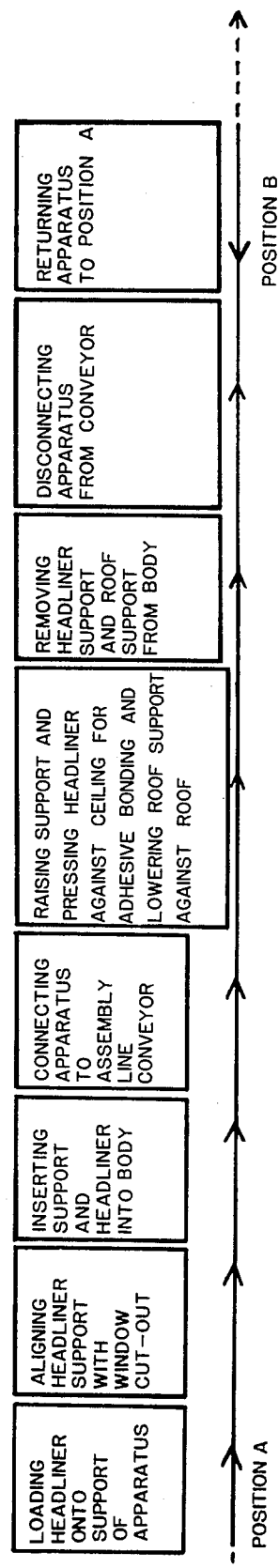
FIG. 1 is a flow diagram of the operations executed by the apparatus of the present invention.

As shown in the flow diagram of FIG. 1, the apparatus in accordance with the invention is initially in a first position, labeled A, along a conveyor system of an assembly line. The first position may be positioned in front of an automotive body moved along the assembly line by a conveyor system to be equipped with a headliner and behind another automotive body into which a headliner has just been installed. At this first position a headliner positioned on a pallet is loaded into the apparatus and a pallet emptied during the previous headliner mounting operation may be ejected.

Thereafter, the apparatus is connected to the conveyor system of the assembly line for absolutely synchronous movement with the automotive body into which the headliner is to be mounted. Such absolute synchronism of movement is essential as it prevents relative movement between the automotive body and the headliner and, thus, distortions in the relatively soft headliner. Support means on which the pallet and the headliner have been placed are moved to a position appropriate for insertion through a window cut-out of the automotive body, while at substantially the same time a counter-pressure means is raised to a level somewhat higher than the roof of the body. Thereafter the support means with the headliner and the pallet thereon is moved into the interior of the automotive body through the window cut-out thereof, and the counter-pressure arm is simultaneously moved over the roof of the body.

Sensors may be provided for correctly placing the support means and the counter-pressure arm relative to the automotive body. Thereafter, the support means is raised to press the headliner into engagement with the ceiling of the automotive body while at the same time the counter-pressure arm is lowered into engagement with the roof of the body to counteract the pressure exerted by the support means. Once the headliner has been bonded to the ceiling of the body, the support means is lowered and the counter-pressure means is raised, and they are withdrawn from the automotive body in a direction substantially parallel to the movement of the assembly line conveyor. After removal from the body the support means and the counter-pressure means, at a second position along the assembly line and displaced from the first position, are raised to a level higher than the roof of the body, the apparatus is disconnected from the conveyor system and is driven back, by motor means provided in the apparatus, to the first position, in a direction opposite the direction of movement of the conveyor system. When it has returned to the first position the apparatus will repeat its operation on a further automotive body which will in the meantime have approached the first position.

Advantageously, engagement of the headliner with the ceiling, and of the counter-pressure means with the roof, of the automotive body may be by way of inflatable pressure pads connected to a common source of a pressurized fluid.

The operation of mounting a headliner has been schematically depicted to provide for loading of the headliner at the first position along the assembly line. It will be understood, however, that the headliner may also be loaded into the apparatus at the second position which may thereafter be driven to the first position to commence its mounting operation.

Figure 2:
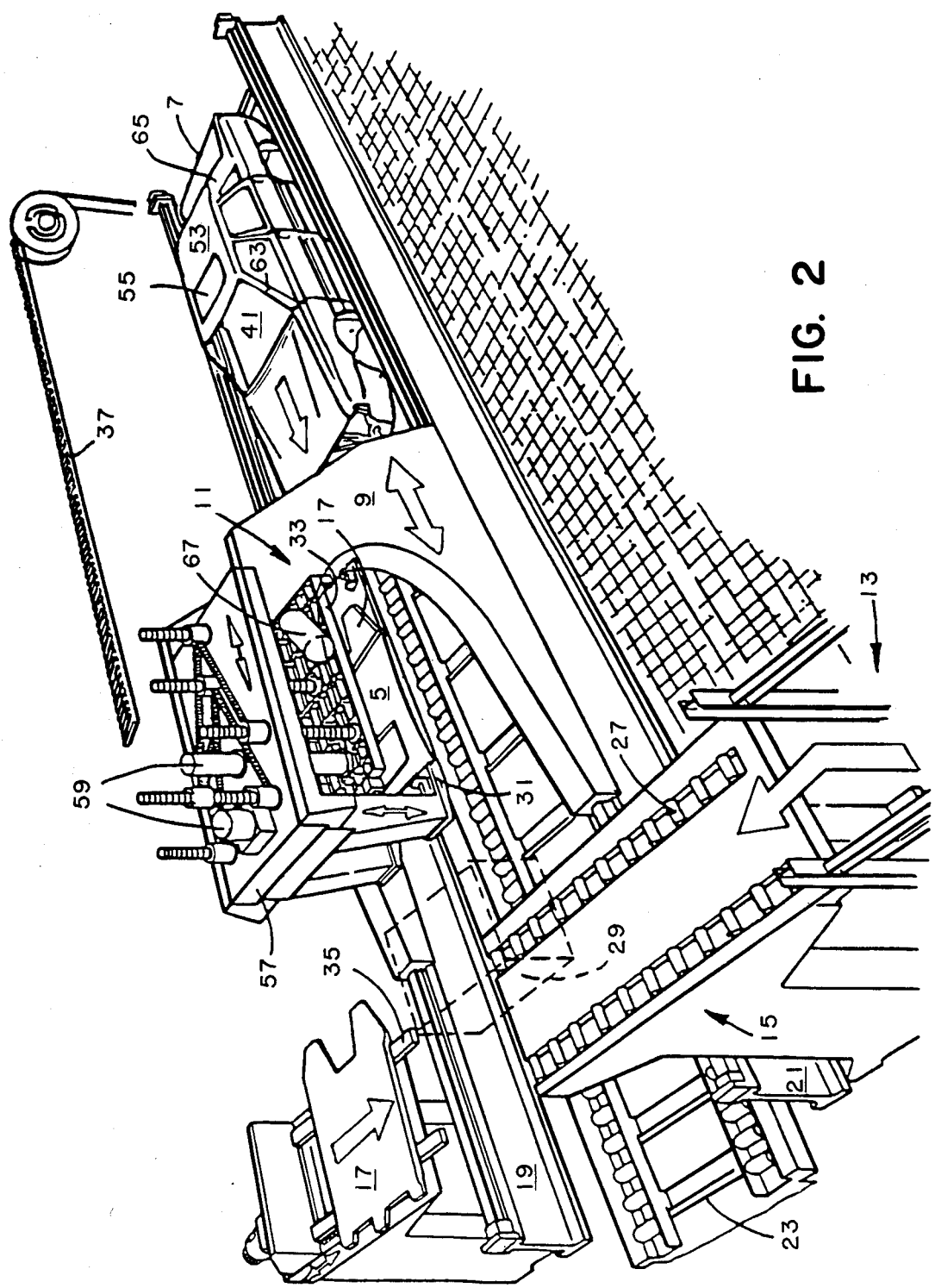
FIG. 2 is a schematic view, in perspective, of the apparatus of the present invention.

As shown in FIG. 2, the apparatus in accordance with a preferred embodiment of the invention comprises a U-shaped frame member 9 the legs of which are positioned on opposite sides of a conveyor 23 of an automobile assembly line along which automotive bodies 7 (only one shown for clarity) are moved consecutively at a substantially uniform speed and at regular intervals for the purpose of being assembled in a manner well known in the art. Typically, the bodies 7 are placed on the conveyor 23 in close sequence. The frame member 9 is of a size sufficient to permit the bodies 7 to pass through its legs. The frame member 9 is seen to carry a jig 11 comprising a substantially C-shaped member having substantially horizontally disposed arms which may be moved vertically relative to each other and horizontally relative to the frame member 9 in a manner to be described.

The jig 11 is mounted for vertical movement within the frame 9 between an upper position which is high enough to permit relative movement of bodies 7 through the frame 9, below the jig 11, and a lower position which is selectively adjustable for alignment relative to window cut-outs 41 of vehicular bodies 7 moving along the conveyor 23.

The frame member 9 is adapted selectively to be connected to the conveyor 23 for synchronous movement therewith from a first position shown to comprise a loading and unloading station 15 for headliners 5, including a continuous elevator system 13, to a second position at which mounting of a headliner 5 into the body 7 of a vehicle will have been completed, as will be described. The elevator system 13 extends from a level below the assembly line to a bridging member at time connecting it with a receiving means on the other side of the assembly line as will be explained below.

The legs of the frame 9 are supported by wheels running upon rails 19 and 21 provided at opposite sides of the conveyor 23. In this manner the frame 9 may move along the assembly line between the first and second positions.

A sensing station (not shown) is provided adjacent the assembly line along which the bodies 7 are moved by the conveyor 23. The sensing station generates signals representative of the type or configuration of the bodies which signals are utilized for controlling means for automatically selecting or sorting headliners 5 suited for a given body 7. Also, the sensing station may detect whether doors, trunks or hoods of the bodies 7 are closed, and may activate appropriate controls if they are not. For instance, where a door is found to be open an indicator may give off audible or visible signals and/or stop the conveyor 23. Also, the height of each body 7 is may be measured by sensors engaging diametrically opposite corner sections of the roof. Values representative of these measurements may then be utilized for the automatic mounting of a headliner 5, or where the measurement indicates a body 7 improperly placed on the conveyor 23 the latter may be stopped for corrective action. Such sensors are state of the art and are thus deemed not to require a detailed description. They are mentioned merely because their cooperation with the headliner assembly station may render its operation more efficient than it would be without such sensors.

The headliners 5 may be loaded onto a conveyor system of an automatic adhesive spraying apparatus (not shown) preferably provided on a floor below the assembly line. At the adhesive spraying apparatus a coating of adhesive is applied in a continuous operation to that surface of the headliner 5 which is to engage the ceiling of a vehicle.

The selection of headliners 5 suited for the bodies 7 conveyed along the assembly line is, as has been stated above, made on the basis of data gathered at the sensing station.

After leaving the adhesive spraying station, a headliner 5 with its adhesive coated surface facing upwardly, may be placed upon a pallet 17 (see FIG. 4). There is no pictorial presentation of this operation as it is performed by means well known in the art. The headliner 5 is aligned with the surface of the pallet 17 by means of two apertures 25 provided in forward corner sections of the headliner 5. After the headliner has been affixed to the roof of a body 7, the apertures may be used to mount sun visor brackets. The pallet 17 with the headliner placed thereon may then be inserted into an upper compartment of a double-compartmented conveyor cage of the endless conveyor 13. The cage (not shown) may subsequently be lifted to eject an empty pallet from the lower compartment (also not shown) of the cage. After raising the cage by the continuous elevator 13 into the loading station 15, the pallet 17 with the headliner 5 thereon may be moved onto the support arm of the mounting jig 11.

Before being loaded onto the jig 11, however, the pallet 17 may be conveyed to a heating station 29 (shown in broken lines) by means of a conveyor 27. The heating station 29 may comprise a plurality of radiant heat deflectors mounted above the pallet 17 to activate the adhesive layer of the headliner 5 at a temperature of about 80° C. (176°). In a relatively short time—about 30 seconds—the heat treatment causes evaporation of sufficient water from the layer of adhesive to provide an optimum adhesive bond in a short time when the headliner 5 is pressed against the ceiling of the body 7. The number of heat deflectors utilized depends upon the size of the headliner to be treated. Needless to say, the deflectors may be actuated automatically in response to signals from the sensors mentioned above. For instance, headliners for station wagons may require more deflectors than headliners for limousines.

Once the adhesive has been activated, the loaded pallet 17 may be moved by the conveyor 27 to a position whence it may be transferred to the lower of the arms of the C-shaped jig 11. As soon as the frame member 9 and the mounting jig 11 have arrived at the first position, and the height of the jig 11 has been appropriately adjusted, the loaded pallet is moved onto the jig 11 by a shuttle mechanism (not shown) of the kind well known in the art, and an empty pallet present in the jig may be ejected therefrom at substantially the same time. The loaded pallet 17 is properly positioned within the jig 11 by an alignment or abutment member present on the lower arm 31 of the jig 11. The alignment member is of well known construction and is neither depicted in the drawings nor described in the specification. The pallet 17 is preferably supported on the arm 31 in a floating manner to provide for ease of alignment of the headliner 5 relative to the ceiling of the body 7. After the pallet 17 and headliner 5 have been properly positioned on the support arm 31 the jig 11 is moved away from the conveyor 13.

As soon as the jig 11 has moved away from the loading station or conveyor 13 a bridge member 35 is moved between the endless elevator and ejection station on the opposite side of the assembly line to move the previously ejected empty pallet 17 into a cage in the elevator 13 for return to the subterranean headliner supply system.

Figure 3:
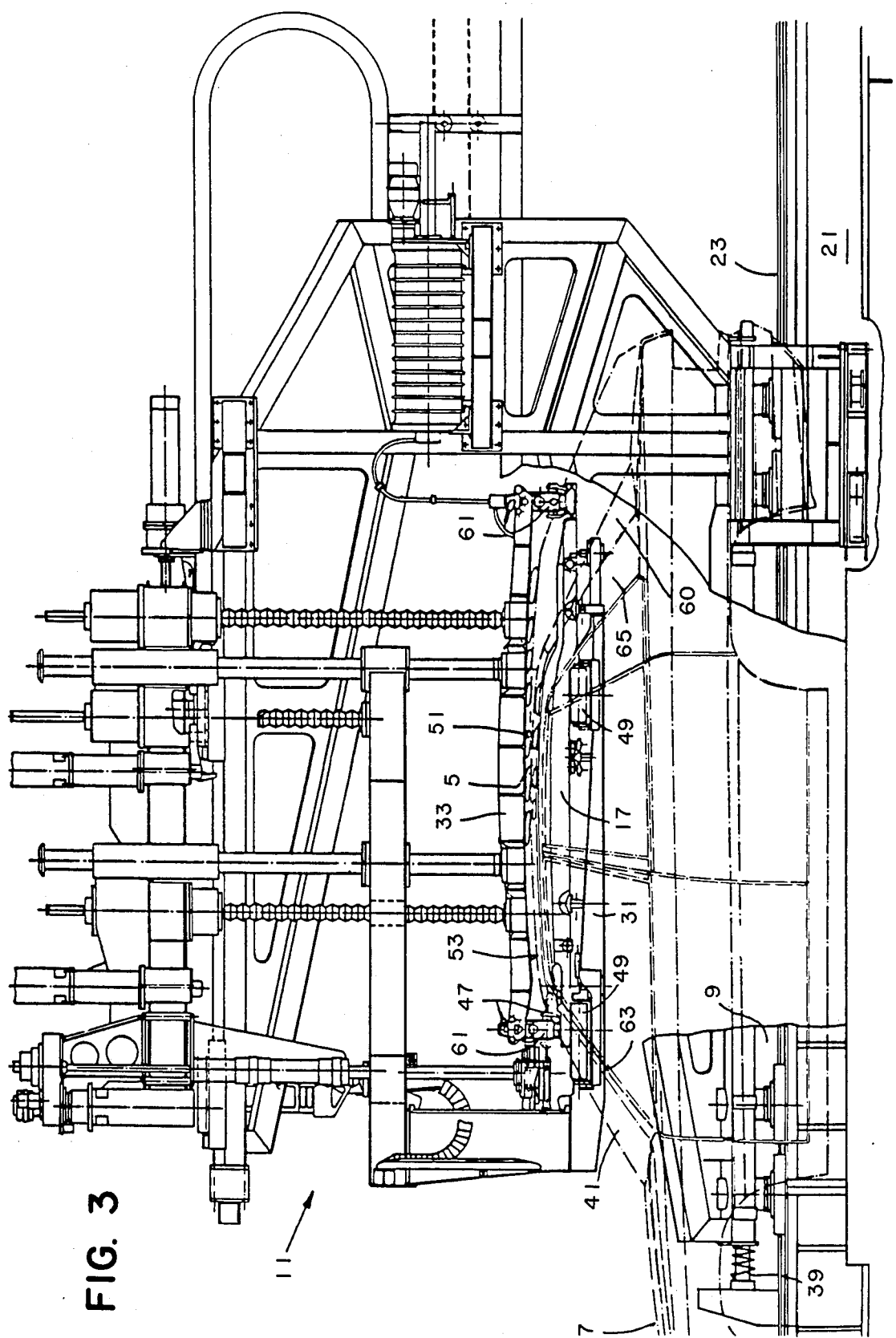
FIG. 3 is a side view, on an enlarged scale, of details of the apparatus shown in FIG. 2.

The movable frame member 9 with the jig 11 mounted thereon has been shown in FIGS. 2 and 3 in a position from which it may be moved towards the body 7 of a vehicle approaching them on the conveyor 23. To reduce friction the legs of the frame member 9 may be provided with roller or ball bearings for running along the rails 19 and 21. The jig 11 is mounted in the frame member 9 by means of a plurality of, for instance four, slides supported by ball bearings (not shown). Movement may be imparted to the frame member 9 by means of electric motor energized from a current source by a supply cable harnesses extending along both sides of the frame member 9 (not shown). For precise motion the electric motor is preferably a d.c. motor connected to the frame member by a drive shaft and toothed belts 37 (only one shown) extending substantially parallel to the sides of the assembly line. The frame member 9 may be moved at a linear speed of about 60 m/min. Shock absorbers 39 may be provided at both ends of the rails 19 and 21 to cushion any unintentional movement of the frame member 9 beyond its intended operative range of movement between its first and second positions.

When the frame 9 has moved to a position between two consecutive automotive bodies 7 moving along the assembly line, the mounting jig 11 is lowered to a level permitting its lower arm 31 with the pallet 17 and headliner 5 thereon to be inserted into the interior of the body 7 through the windshield cut-out 41 thereof. It will be appreciated by those skilled in the art that the automobile body 7 over which the frame member 9 has to move to assume this position is one into which a headliner 5 has just been mounted. Once the support arm 31 has been inserted into the automobile body 7 clamping means (not shown) provided on the frame member 9 are activated to connect the frame member 9 to the conveyor 23 for synchronous and codirectional movement therewith to avoid any relative movement between them. The conveyor 23 may be provided with lugs (not shown) to cooperate with the clamping means.

Before describing the mounting operation of the headliner 5, the structure of the pallet 17 will be described. The pallet 17 is an important component of the mounting apparatus as it relates directly to to the type or configuration of body 7 to be equipped with a headliner 5. The pallet 17 serves at least three purposes: (1) It carries or supports the headliner 5; (2) it moves into the interior of the body 7 with the headliner 5; and (3) during the adhesive mounting operation it presses the headliner 5 against the ceiling of the body 7 in a controlled manner. The pallet 17 is preferably rigid to avoid flexing and may be made of a cast aluminum alloy. It is depicted to be of substantially flat configuration but has a somewhat convex upper surface conforming to the generally concave lower surface of the headliner 5 with which it is to be used.

Preferably, the pallet 17 is equipped with one or more inflatable pressure pads 43 by means of which the headliner 5 may be pressed against the ceiling of the vehicular body 7 at substantially evenly distributed pressure. A clamping bracket 45 may be provided at each corner of the pallet 17 by means of which the pallet 17 may be suspended in a substantially floating manner. As will be described, the clamping brackets 45 serve at times to connect the pallet 17 to the upper arm 33 of the jig 11. In this connection, it is to be noted that the pallet 17 is of very simple construction in that it is devoid of any control means whatsoever.

The upper arm 33 is of substantially flat configuration and may comprise an inflatable member which, as will be described, may serve to support the roof of the body 7 and to inflate the pressure pad or pads 43 of the pallet 17. The arm 33 is mounted for vertical movement. To impart such movement the arm 33 may be provided with well known ball bearing spindles driven by d.c. motors (not shown).

To assure their proper positioning movement, the upper and lower arms 31 and 33 may be controlled by appropriate sensors. For instance, a measuring probe 47 may be provided on the lower arm 31. This probe 47 may be activated when the lower arm 31 is moved through the window cut-out to determine the position of the headliner 5 longitudinally of the ceiling of the body 7 and to make adjustments as required. An alignment system including two pairs of rollers 49 positioned to slide along the roof supports of the body 7 during upward vertical movement of the lower arm 31 may also be provided for the proper positioning of the headliner 5 with respect to the ceiling of the body 7.

The upper arm 33 may be provided with an inflatable pressure pad 51 which may be moved into engagement with the roof 53 of the body 7 to provide pressure countering the pressure required to mount the headliner 5 to the ceiling and to support the roof 53 of the vehicle. Preferably, the pressure pad 51 comprises a plurality of separately inflatable chambers arranged to provide pressure at selected portions of the roof 53. For instance, where a body 7 having a cut-out for a sun roof is to be accommodated, the pressure pad 51 may comprise a separately inflatable chambers correspondingly positioned. Of course, the pressure pad 43 of the lower arm 31 may be similarly configured. The pressure distribution system for the lower and upper pads 43 and 51 is preferably provided in the upper unit 33. Means may be provided for automatically connecting the lower pad 43 to the upper one when the pallet 17 is placed into the jig 11.

For moving the jig 11 relative to the frame member 9 it may be suspended by a slide 57. The slide 57 and the upper and lower arms 31 and 33 are aligned with respect to each other by at least two ball bearing spindles 59. Four clamps 61 present on the upper arm 33 may be actuated to engage the clamping brackets 45 at the corners of the pallet 17 to connect the pallet 17 with the upper arm 33. With the upper arm 33 and its pressure pad 51 and the pallet 17 with the headliner 5 thereon properly placed relative to the roof 53 and ceiling of the body 7, respectively, the headliner 5 may be pressed against the ceiling by inflating the pressure pads 51 and 43.

The mounting operation of the headliner 5 will now be described. When the frame member 9 has moved between the two bodies 7 in the aforesaid manner the vertical position of the mounting jig 11 is adjusted and the lower arm 31 with the pallet 17 and headliner 5 thereon is inserted into the interior of the body 7 through the windshield cut-out 41 thereof. When the arm 31 has been inserted into the body 7, but in any event before the headliner 5 is moved into engagement with the ceiling, the frame member 9 is connected to the conveyor 23 for snychronous movement therewith. The longitudinal positioning of the jig 11 relative to the body 7 is controlled in a known manner by sensors which form no part of the present invention and is carried out by movement of the slide 57 relative to the frame member 9. The control of the vertical movement of the lower arm 31 and the headliner 5 placed thereon is augmented by the rollers 49 moving along the front and rear roof supports 63 and 65.

Once the jig 11 has been properly placed with respect to the roof of the body 7 the upper and lower arms 31 and 33 are moved towards each other until the clamps 61 engage the clamping brackets 45 of the pallet 17. The clamps 61 may be provided with pressure conduits which automatically connect with ports in the pressure pad of the pallet 17 when the clamping brackets 45 are engaged.

One or more pressure cylinders 67 may be mounted on the upper arm 33 for inflating the pressure pads 43 and 51 with a suitable fluid such as air, at a level appropriate for establishing an adhesive bond between the headliner 5 and the ceiling of the body 7 without damaging the roof. Well known means (not shown) may be provided for controlling the level of pressure in the upper and lower pressure pads. Preferably, the pressure exerted by the upper and lower pressure pads is equal but may in certain circumstances be different. In order to establish a firm adhesive bond between the headliner 5 and the ceiling, the pressure may be maintained for about 20 seconds, it being understood that this interval is a function of the properties of the adhesive. In any event, the bond should be sufficiently strong to permit the pressure to me released by removal of the jig 11 from the body 7 not later than when the frame member 9 has been moved to its second position along the assembly line.

Since the adhesive used in the practice of the invention is preferably a solvent free one, it is important for avoiding entrapping air between the headliner 5 and the ceiling 53 that the pressure for mounting the headliner be initially concentrated in a central location of the headliner whence it may be spread in a radial pattern to cover the total surface area of the headliner 5. Such a pressure spread pattern may be accomplished by an arrangement as shown in FIG. 4 comprising a vertically movable plunger 69 in a substantially central position of the pallet 17, and belts 71 embracing the pressure pad 43. The belts 71 may be dimensioned such that when the pressure pad 69 inflated only a central portion surrounding the plunger 69 initially engages the ceiling 53. Raising the pressure within the pad 43 causes engagement of the headliner 5 with the ceiling 53 in the desired radial spread pattern.

When the adhesive bond has been established the lower arm 31 is lowered, the upper arm 33 is raised, and the slide 57 is moved in the direction of movement of the conveyor 23 to remove the jig 11 from the body 7. Thereafter the jig 11 is raised to a level to permit the frame member 9 to be driven to its first position along the assembly line, after it has been disconnected from the conveyor 23. In the embodiment described, the first position is where headliners are loaded onto the jig 11. It will, of course, be understood that loading of the headliners may also take place at the second postion, before the frame 9 commences its return movement to the first position.

To insure that the jig 11 may be placed into as accurate a position in the loading station as possible to receive another headliner 5 and eject its now empty pallet 17, the measuring or sensing system 47 is used to control movement of the jig 11, for the frame member 9 is too heavy to permit calibrating its movement with sufficient precision for correctly positioning the jig 11 relative to the loading station. Once a new pallet 17 and headliner 5 have been loaded into the jig 17, and the emptied pallet 17 has been removed therefrom, the apparatus repeats its described operational cycle to mount a headliner into the automotive body next on the conveyor 13.

Ready-made headliners of the kind useful in connection with the invention may be those, for instance, which are fabricated from porous fiber materials or from foamed polymeric materials coated with textile webs or plastic foils to provide for a pleasant appearance.

An apparatus of the kind described has been found to yield excellent results in the automatic mounting of headliners into automobiles and the like within the framework of an assembly line operation. As will be appreciated by those skilled in the art, certain changes and rearrangement of components may be effected in the apparatus without departing from the spirit of the described invention and the scope of protection sought for it.

What is claimed is:

1. An apparatus for mounting ready-made headliners into automotive bodies moved in a predetermined direction by conveyor means at a substantially constant speed and at predetermined intervals at least between first and second positions along an assembly line, comprising:
- a frame member mounted for movement parallel to said conveyor means between said first and second positions and comprising an opening for passing said automotive bodies therethrough;
- means for selectively connecting said frame member to said conveyor means for synchronous movement therewith from said first position to said second position;
- jig means mounted on said frame member and comprising a first horizontally disposed member for supporting a headliner thereon and a second substantially horizontally disposed member superposed over said first member;
- means for moving said first and second members between an elevated position in which said automotive bodies may pass through said opening and a lower position in which said first member is aligned with a window cut-out of one of said automobiles;
- means for moving said first member, when it is in its lower position, in a direction parallel to said predetermined direction between a position outside of said automotive body and a position inside of said automotive body;
- means for vertically moving said first member, when it is inside of said body and said frame member is connected to said conveyor means, between said inside position and a third position in which it presses said headliner into engagement with the ceiling of said automotive body;
- means for substantially simultaneously moving said second member into engagement with the roof of said automotive body to counteract the pressure exerted by said first member; and
- means for disconnecting said frame member from said conveyor means at said second position.

2. The apparatus of claim 1, further comprising means for returning said frame member from said second position to said first position.

3. The apparatus of claim 1, wherein said first member is provided with pressure inflatable means for supporting said headliner.

4. The apparatus of claim 3, wherein said pressure inflatable means comprises a pallet removable from said first member.

5. The apparatus of claim 4, further comprising means adjacent one of said first and second positions along said assembly line for loading a headliner onto said first member.

6. The apparatus of claim 5, wherein said headliner is placed on a pallet for loading onto said first member.

7. The apparatus of claim 6, wherein said second horizontally disposed member is provided with pressure inflatable means for engagement with said roof.

8. The apparatus of claim 7, wherein said second member is provided with clamping means for releasably engaging said first member in its third position.

9. The apparatus of claim 8, wherein said second member is provided with means for providing a pressurized fluid.

10. The apparatus of claim 9, wherein said second member is provided with means for connecting said pressurized fluid to said inflatable means of said first member.

11. The apparatus of claim 10, wherein said headliner is pressed into engagement with said ceiling by pressurizing said inflatable means of said first member.

12. The apparatus of claim 11, wherein said inflatable means of said first and second members comprise separately inflatable pads.

13. The apparatus of claim 12, wherein said inflatable means of said first member are provided with radially disposed belts.

14. The apparatus of claim 2, wherein said means for returning said frame member to said first position comprises an electric motor.

15. The apparatus of claim 14, wherein said electric motor comprises a d.c. motor.

16. The apparatus of claim 1, wherein said frame member is supported by wheels running on rails extending in parallel to said assembly line on opposite sides thereof.

17. The apparatus of claim 1, wherein said means for moving said first and second members includes ball bearing spindles.

18. The apparatus of claim 1, wherein said means for horizontally moving said jig means comprises a ball bearing slide.

19. The apparatus of claim 1, further comprising means for sensing the disposition of an automotive body on said conveyor means.

* * * * *